(12) United States Patent
Davies et al.

(10) Patent No.: US 11,162,746 B2
(45) Date of Patent: Nov. 2, 2021

(54) LIQUID DRAINS IN CORE-IN-SHELL HEAT EXCHANGER

(71) Applicant: CONOCOPHILLIPS COMPANY, Houston, TX (US)

(72) Inventors: Paul R. Davies, Houston, TX (US); Amal C. Phadke, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 16/454,790

(22) Filed: Jun. 27, 2019

(65) Prior Publication Data
US 2019/0316856 A1    Oct. 17, 2019

Related U.S. Application Data

(62) Division of application No. 14/701,623, filed on May 1, 2015, now Pat. No. 10,378,837.
(Continued)

(51) Int. Cl.
*F25J 1/00* (2006.01)
*F28F 27/00* (2006.01)
(Continued)

(52) U.S. Cl.
CPC .............. *F28F 27/00* (2013.01); *B23P 15/26* (2013.01); *F25J 1/004* (2013.01); *F25J 1/0022* (2013.01);
(Continued)

(58) Field of Classification Search
CPC .............. F28D 9/0006; F28D 21/0017; F28D 2021/0033; F25J 5/005; F25J 2250/02; F25J 2250/20; F17C 2260/016
See application file for complete search history.

(56) References Cited

U.S. PATENT DOCUMENTS

| | | | | |
|---|---|---|---|---|
| 4,317,336 A | * | 3/1982 | Bennett | H01J 23/033 165/104.27 |
| 5,590,544 A | | 1/1997 | Corduan et al. | |

(Continued)

FOREIGN PATENT DOCUMENTS

| | | | | |
|---|---|---|---|---|
| CN | 203259037 U | | 10/2013 | |
| DE | 1949609 A1 | * | 4/1971 | ........... F25J 3/04412 |

(Continued)

OTHER PUBLICATIONS

International Search Report for PCT/US15/28723 dated Aug. 10, 2015; 3 pgs.

*Primary Examiner* — Eric S Ruppert
(74) *Attorney, Agent, or Firm* — Polsinelli PC (57) ABSTRACT

A core-in-shell heat exchanger, a method of fabricating the core-in-shell heat exchanger, and a method of exchanging heat in a core-in-shell heat exchanger disposed on a slosh-inducing moving platform are described. The method of exchanging heat includes introducing a shell-side fluid into a shell of the core-in-shell heat exchanger and introducing a fluid to be cooled into each of one or more cores of the core-in-shell heat exchanger, the one or more cores being arranged along an axial length of the shell with a plurality of baffles disposed on either side of the one or more cores along the axial length of the shell to reduce slosh of the shell-side fluid. The method also includes draining excess shell-side fluid using a plurality of drains, at least two of the plurality of drains being disposed on opposite sides of one of the plurality of baffles.

20 Claims, 4 Drawing Sheets

Related U.S. Application Data (60) Provisional application No. 61/987,164, filed on May 1, 2014.

(51) Int. Cl.
  *B23P 15/26* (2006.01)
  *F28D 1/02* (2006.01)
  *F28F 9/22* (2006.01)
  *F28D 9/00* (2006.01)
  *F25J 5/00* (2006.01)
  *F25J 1/02* (2006.01)
  *F28D 21/00* (2006.01)

(52) U.S. Cl.
  CPC .......... *F25J 1/0052* (2013.01); *F25J 1/0085* (2013.01); *F25J 1/0087* (2013.01); *F25J 1/021* (2013.01); *F25J 1/0278* (2013.01); *F25J 5/005* (2013.01); *F28D 1/0213* (2013.01); *F28D 9/0006* (2013.01); *F28D 9/0093* (2013.01); *F28F 9/22* (2013.01); *F25J 2250/02* (2013.01); *F25J 2250/20* (2013.01); *F28D 2021/0033* (2013.01); *F28F 2265/06* (2013.01); *F28F 2265/28* (2013.01); *Y10T 29/49352* (2015.01)

(56) References Cited

U.S. PATENT DOCUMENTS

| | | |
|---|---|---|
| 2003/0070793 A1 | 4/2003 | Dierbeck |
| 2012/0175091 A1 | 7/2012 | Kreis et al. |
| 2012/0298232 A1* | 11/2012 | Ekholm .................. F17C 13/04 137/599.01 |
| 2013/0153179 A1 | 6/2013 | Davies et al. |
| 2013/0160487 A1 | 6/2013 | Davies et al. |

FOREIGN PATENT DOCUMENTS

| | | |
|---|---|---|
| EP | 0607006 A1 | 7/1994 |
| GB | 204025 A1 | 5/1924 |
| WO | 2013096323 A1 | 6/2013 |

\* cited by examiner

A-A Cross Sectional View

FIG. 5

LIQUID DRAINS IN CORE-IN-SHELL HEAT EXCHANGER

CROSS-REFERENCE TO RELATED APPLICATIONS

This application is a divisional application which claims benefit under 35 USC § 120 to U.S. application Ser. No. 14/701,623 filed May 1, 2015 entitled, "LIQUID DRAINS IN CORE-IN-SHELL HEAT EXCHANGER," which claims benefit under 35 USC § 119(e) to U.S. Provisional Application Ser. No. 61/987,164 filed May 1, 2014, entitled "LIQUID DRAINS IN CORE-IN-SHELL HEAT EXCHANGER."

FIELD OF THE INVENTION

This invention relates to an arrangement of drains in a core-in-shell heat exchanger that includes baffles separating the cores. The drainage of refrigerant from a heat exchanger shell was previously addressed by providing a single drain to flow liquid into a scrubber or flare system, for example. However, when the cores of the heat exchanger are separated by baffles, the single drain arrangement can have a negative effect on the efficiency of the heat exchanger operation.

BACKGROUND OF THE INVENTION

Cryogenic liquefaction is commonly used to convert natural gas into a more convenient form for transportation and/or storage. Because liquefying natural gas greatly reduces its specific volume, large quantities of natural gas can be economically transported and/or stored in liquefied form.

Transporting natural gas in its liquefied form can effectively link a natural gas source with a distant market when the source and market are not connected by a pipeline. This situation commonly arises when the source of natural gas and the market for the natural gas are separated by large bodies of water. In such cases, liquefied natural gas (LNG) can be transported from the source to the market using specially designed ocean-going LNG tankers.

Storing natural gas in its liquefied form can help balance periodic fluctuations in natural gas supply and demand. In particular, LNG can be "stockpiled" for use when natural gas demand is low and/or supply is high. As a result, future demand peaks can be met with LNG from storage, which can be vaporized as demand requires.

Several methods exist for liquefying natural gas. Some methods produce a pressurized LNG (PLNG) product that is useful, but requires expensive pressure-containing vessels for storage and transportation. Other methods produce an LNG product having a pressure at or near atmospheric pressure. In general, these non-pressurized LNG production methods involve cooling a natural gas stream through indirect heat exchange with one or more refrigerants and then expanding the cooled natural gas stream to near atmospheric pressure. In addition, most LNG facilities employ one or more systems to remove contaminants (e.g., water, mercury and mercury components, acid gases, and nitrogen, as well as a portion of ethane and heavier components) from the natural gas stream at different points during the liquefaction process.

In general, LNG facilities are designed and operated to provide LNG to a single market in a specific region of the world. Because specifications for the final characteristics of the natural gas product, such as, for example, higher heating value (HHV), Wobbe index, methane content, ethane content, $C_3+$ content, and inerts content vary widely throughout the world, LNG facilities are typically optimized to meet a certain set of specifications for a single market. In large part, achieving the stringent final product specifications involves effectively removing certain components from the natural gas feed stream.

One or more heat exchangers involved in the liquefaction process may be configured as core-in-shell heat exchangers that include one or more cores. In addition, when the LNG processing is done off shore, baffles are used between cores of the heat exchanger to address the sloshing of the shell-side liquid (refrigerant). Because the baffles cause a pressure gradient or horizontal pressure drop across the shell, the single drain configuration results in unequal refrigerant levels at different parts (related to different cores) of the heat exchanger. Unequal refrigerant levels can cause several problems. In a core in which the shell-side liquid level is too high (for example, because the core is farthest from the drain), efficient heat exchange, in the form of boiling of the refrigerant, may be suppressed. In a core in which the shell-side liquid level is too low, the core may not be in contact with the refrigerant and, as a result, heat exchange may not take place at all. The discussion of FIG. 2 below illustrates some of the issues that arise from the prior drain configuration.

Figure 2:
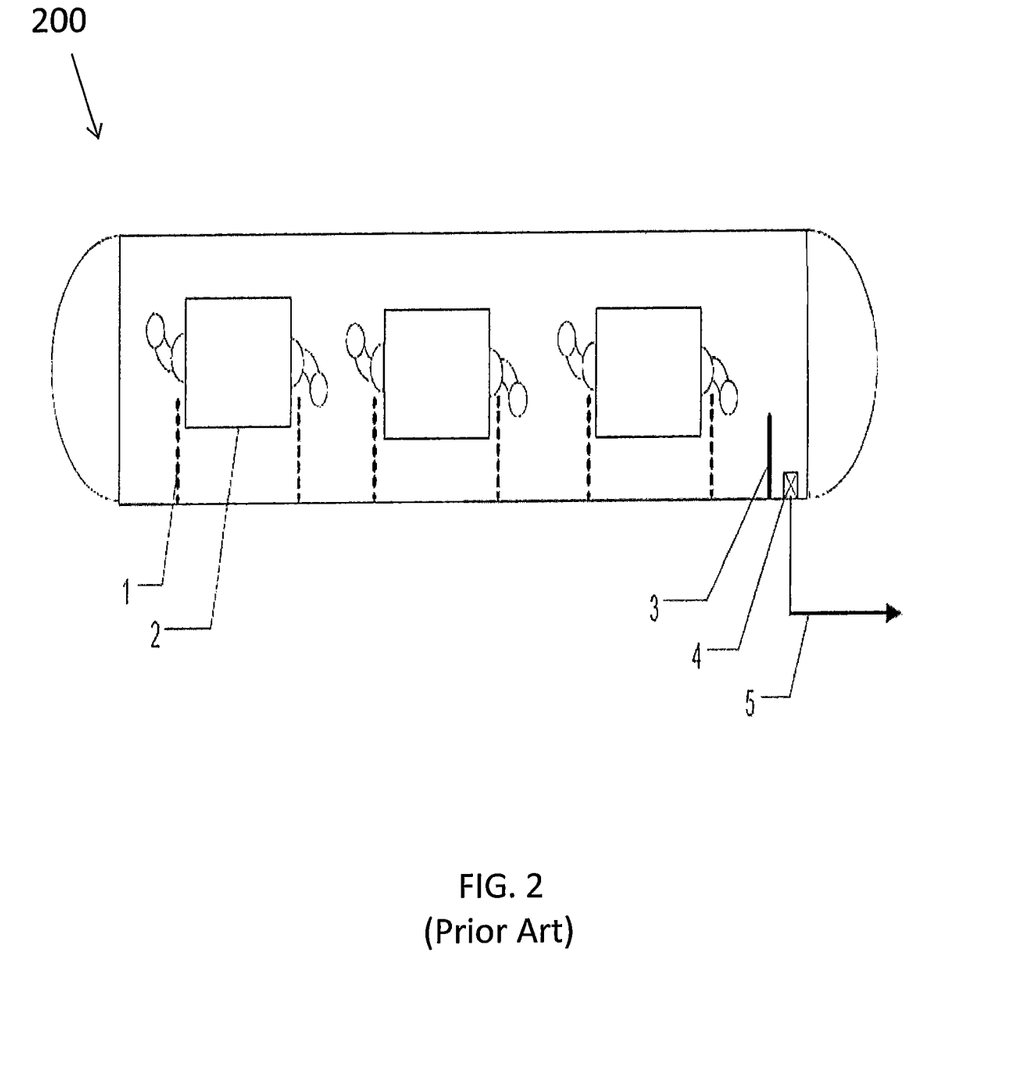
FIG. 2 is a block diagram of a core-in-shell heat exchanger according to the prior art.

FIG. 2 is a block diagram of a core-in-shell heat exchanger 200 according to the prior art. FIG. 2 illustrates the prior approach to draining the shell. The heat exchanger 200 is assumed to be in an off-shore environment, for example, where baffles 1 are used to reduce sloshing of the shell-side fluid (refrigerant). The heat exchanger 200 includes three cores 2 with baffles 1 on either side of each core 2. A weir plate 3 is used to separate the cores from the drain which includes a vortex breaker 4 that minimizes entrained vapor flow into the outlet drain line 5. The baffles 1 are designed to create additional flow resistance within the heat exchanger 200 and dampen the effects of motion to prevent wave action building in the heat exchanger 200, because the wave action could cause liquid to flood over the top of a core 2 or low liquid levels in a core 2 or liquid levels falling beneath a core 2. However, Computational Fluid Dynamics (CFD) analysis, static calculations, and scale model testing have demonstrated that the pressure drop across the baffles 1 required to satisfactorily suppress the liquid motion results in excessive liquid stack-up and flooding in the core 2 located farthest from the weir plate 3. In addition, the core 2 located closest to the weir plate 3 experiences low liquid levels. Due to the resistance to liquid flow caused by the baffles 1, the liquid level in the outflow section experiences low enough liquid level that there is a high potential for gas ingestion into the liquid drain. This gas ingestion is a serious operational constraint and will severely restrict the downstream process equipment capacity and operation. That is, the variations in the liquid level resulting from the baffles 1 can have a deleterious effect on the thermal performance of the heat exchanger 200 and on the mechanical integrity of the heat exchanger 200 due to thermally induced fatigue stress which can shorten the life of the heat exchanger 200 and result in damage and a leaking heat exchanger 200.

SUMMARY OF THE INVENTION

According to an aspect of the invention, a method of exchanging heat in a core-in-shell heat exchanger disposed on a slosh-inducing moving platform includes introducing a shell-side fluid into a shell of the core-in-shell heat exchanger; introducing a fluid to be cooled into each of one or more cores of the core-in-shell heat exchanger, the one or more cores being arranged along an axial length of the shell with a plurality of baffles disposed one either side of the one or more cores along the axial length of the shell to reduce slosh of the shell-side fluid; and draining excess shell-side fluid using a plurality of drains, at least two of the plurality of drains being disposed on opposite sides of one of the plurality of baffles.

According to another aspect of the invention, a method of fabricating a core-in-shell heat exchanger disposed on a moving platform includes arranging one or more cores along an axial length of a shell; arranging a plurality of baffles on either side of the one or more cores along the axial length of the shell; and disposing a plurality of drains in the shell, at least two of the plurality of drains being disposed on opposite sides of one of the plurality of baffles.

According to yet another aspect of the invention, a core-in-shell heat exchanger includes a shell; one or more cores arranged along an axial length of the shell; a plurality of baffles arranged on either side of the one or more cores along the axial length of the shell; and a plurality of drains, at least two of the plurality of drains being disposed on opposite sides of one of the plurality of baffles.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

As noted above, cryogenic liquefaction is used to convert natural gas to a more easily transportable form. As also noted, a core-in-shell heat exchanger used in the process, when performed off-shore, for example, includes baffles between the cores to suppress sloshing of the shell-side fluid (refrigerant). When the existing single-drain configuration is employed in this type of core-in-shell heat exchanger, the result may be unequal shell-side liquid levels and inefficient heat exchange with the core-side fluid. Embodiments of the method and system described herein relate to a drain arrangement that equalizes the shell-side liquid level to address the issues discussed above.

The present invention can be implemented in a facility used to cool natural gas to its liquefaction temperature to thereby produce liquefied natural gas (LNG). The LNG facility generally employs one or more refrigerants (cryogenic fluids) to extract heat from the natural gas and reject to the environment. Numerous configurations of LNG systems exist and the present invention may be implemented in many different types of LNG systems.

In one embodiment, the present invention can be implemented in a mixed refrigerant LNG system. Examples of mixed refrigerant processes can include, but are not limited to, a single refrigeration system using a mixed refrigerant, a propane pre-cooled mixed refrigerant system, and a dual mixed refrigerant system.

In another embodiment, the present invention is implemented in a cascade LNG system employing a cascade-type refrigeration process using one or more predominately pure component refrigerants. The refrigerants utilized in cascade-type refrigeration processes can have successively lower boiling points in order to facilitate heat removal from the natural gas stream being liquefied. Additionally, cascade-type refrigeration processes can include some level of heat integration. For example, a cascade-type refrigeration process can cool one or more refrigerants having a higher volatility through indirect heat exchange with one or more refrigerants having a lower volatility. In addition to cooling the natural gas stream through indirect heat exchange with one or more refrigerants, cascade and mixed-refrigerant LNG systems can employ one or more expansion cooling stages to simultaneously cool the LNG while reducing its pressure.

Figure 1:
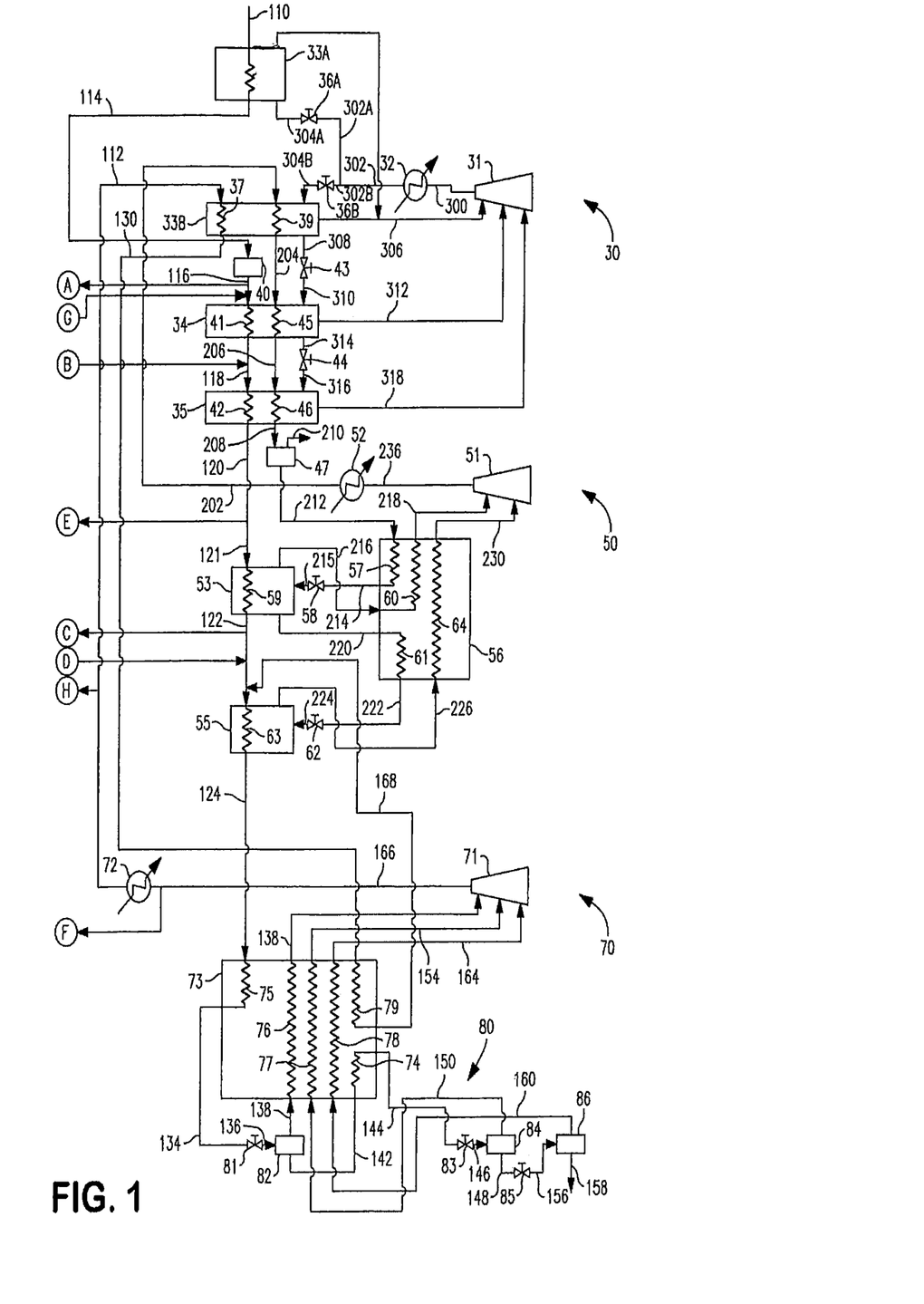
FIG. 1 is a simplified overview of a cascade-type LNG facility configured in accordance with one embodiment of the present invention.

Referring now to FIG. 1, one embodiment of a cascade-type LNG facility in accordance with one embodiment of the present invention is illustrated. The LNG facility depicted in FIG. 1 generally comprises a propane refrigeration cycle 30, an ethylene refrigeration cycle 50, and a methane refrigeration cycle 70 with an expansion section 80. While "propane," "ethylene," and "methane" are used to refer to respective first, second, and third refrigerants, it should be understood that the embodiment illustrated in FIG. 1 and described herein can apply to any combination of suitable refrigerants. The main components of propane refrigeration cycle 30 include a propane compressor 31, a propane cooler/condenser 32, high-stage propane chillers 33A and 33B, an intermediate-stage propane chiller 34, and a low-stage propane chiller 35. The main components of ethylene refrigeration cycle 50 include an ethylene compressor 51, an ethylene cooler 52, a high-stage ethylene chiller 53, a low-stage ethylene chiller/condenser 55, and an ethylene economizer 56. The main components of methane refrigeration cycle 70 include a methane compressor 71, a methane cooler 72, and a methane economizer 73. The main components of expansion section 80 include a high-stage methane expansion valve and/or expander 81, a high-stage methane flash drum 82, an intermediate-stage methane expansion valve and/or expander 83, an intermediate-stage methane flash drum 84, a low-stage methane expansion valve and/or expander 85, and a low-stage methane flash drum 86.

The operation of the LNG facility illustrated in FIG. 1 will now be described in more detail, beginning with propane refrigeration cycle 30. Propane is compressed in multi-stage (e.g., three-stage) propane compressor 31 driven by, for example, a gas turbine driver (not illustrated). The stages of compression may exist in a single unit or two or more separate units mechanically coupled to a single driver. Upon compression, the propane is passed through conduit 300 to propane cooler 32, wherein it is cooled and liquefied through indirect heat exchange with an external fluid (e.g., air or water). The stream from propane cooler 32 can then be passed through conduit 302 to a pressure reduction means, illustrated as expansion valve 36A, wherein the pressure of the liquefied propane is reduced, thereby evaporating or flashing a portion thereof. The resulting two-phase stream then flows through conduit 304a into high-stage propane chiller 33a. High stage propane chiller 33a uses the flashed propane refrigerant to cool the incoming natural gas stream in conduit 110.

The cooled natural gas stream from high-stage propane chiller 33a flows through conduit 114 to a separation vessel, wherein water and in some cases propane and heavier components are removed, typically followed by a treatment system 40, in cases where not already completed in upstream processing, wherein moisture, mercury and mercury compounds, particulates, and other contaminants are removed to create a treated stream. The stream exits the treatment system 40 through conduit 116. Thereafter, a portion of the stream in conduit 116 can be routed through conduit A to a heavies removal zone. The remaining portion of the stream in conduit 116 is combined with a stream in conduit G exiting the heavies removal zone illustrated. The combined stream can then enter intermediate-stage propane chiller 34, wherein the stream is cooled in indirect heat exchange means 41 through indirect heat exchange with a propane refrigerant stream. The resulting cooled stream in conduit 118 can then be recombined with a stream in conduit B exiting heavies removal zone, and the combined stream can then be routed to low-stage propane chiller 35, wherein the stream can be further cooled through indirect heat exchange means 42. The resultant cooled stream can then exit low-stage propane chiller 35 through conduit 120. Subsequently, the cooled stream in conduit 120 can be routed to high-stage ethylene chiller 53.

The combined vaporized propane refrigerant stream exiting high-stage propane chillers 33 and 33A is returned to the high-stage inlet port of propane compressor 31 through conduit 306. The liquid propane refrigerant in high-stage propane chiller 33A provides refrigeration duty for the natural gas stream 110. Two-phase refrigerant stream can enter the intermediate-stage propane chiller 34 through conduit 310, thereby providing coolant for the natural gas stream (in conduit 116) and to streams entering intermediate-stage propane chiller 34 through conduits 204 and 310. The vaporized portion of the propane refrigerant exits intermediate-stage propane chiller 34 through conduit 312 and can then enter the intermediate-stage inlet port of propane compressor 31. The liquefied portion of the propane refrigerant exits intermediate-stage propane chiller 34 through conduit 314 and is passed through a pressure-reduction means, illustrated here as expansion valve 44, whereupon the pressure of the liquefied propane refrigerant is reduced to thereby flash or vaporize a portion thereof. The resulting vapor-liquid refrigerant stream can then be routed to low-stage propane chiller 35 through conduit 316 and where the refrigerant stream can cool the methane-rich stream and an ethylene refrigerant stream entering low-stage propane chiller 35 through conduits 118 and 206, respectively. The vaporized propane refrigerant stream then exits low-stage propane chiller 35 and is routed to the low-stage inlet port of propane compressor 31 through conduit 318 wherein it is compressed and recycled as previously described.

As shown in FIG. 1, a stream of ethylene refrigerant in conduit 202 enters high-stage propane chiller 33b, wherein the ethylene stream is cooled through indirect heat exchange means 39. The resulting cooled ethylene stream can then be routed in conduit 204 from high-stage propane chiller 33b to intermediate-stage propane chiller 34. Upon entering intermediate-stage propane chiller 34, the ethylene refrigerant stream can be further cooled through indirect heat exchange means 45 in intermediate-stage propane chiller 34. The resulting cooled ethylene stream can then exit intermediate-stage propane chiller 34 and can be routed through conduit 206 to enter low-stage propane chiller 35. In low-stage propane chiller 35, the ethylene refrigerant stream can be at least partially condensed, or condensed in its entirety, through indirect heat exchange means 46. The resulting stream exits low-stage propane chiller 35 through conduit 208 and can subsequently be routed to a separation vessel 47, wherein a vapor portion of the stream, if present, can be removed through conduit 210, while a liquid portion of the ethylene refrigerant stream can exit separator 47 through conduit 212. The liquid portion of the ethylene refrigerant stream exiting separator 47 can have a representative temperature and pressure of about −24° F. (about −31° C.) and about 285 psia (about 1,965 kPa).

Turning now to ethylene refrigeration cycle 50 in FIG. 1, the liquefied ethylene refrigerant stream in conduit 212 can enter ethylene economizer 56, wherein the stream can be further cooled by an indirect heat exchange means 57. The resulting cooled liquid ethylene stream in conduit 214 can then be routed through a pressure reduction means, illustrated here as expansion valve 58, whereupon the pressure of the cooled predominantly liquid ethylene stream is reduced to thereby flash or vaporize a portion thereof. The cooled, two-phase stream in conduit 215 can then enter high-stage ethylene chiller 53. In high-stage ethylene chiller 53, at least a portion of the ethylene refrigerant stream can vaporize to further cool the stream in conduit 121 entering an indirect heat exchange means 59. The vaporized and remaining liquefied ethylene refrigerant exits high-stage ethylene chiller 53 through respective conduits 216 and 220. The vaporized ethylene refrigerant in conduit 216 can re-enter ethylene economizer 56, wherein the stream can be warmed through an indirect heat exchange means 60 prior to entering the high-stage inlet port of ethylene compressor 51 through conduit 218, as shown in FIG. 1.

The cooled stream in conduit 120 exiting low-stage propane chiller 35 can thereafter be split into two portions, as shown in FIG. 1. At least a portion of the natural gas stream can be routed through conduit E. While the remaining portion of the cooled natural gas stream in conduit 121 can be routed to high-stage ethylene chiller 53, and then can be and cooled in indirect heat exchange means 59 of high-stage ethylene chiller 53.

The remaining liquefied ethylene refrigerant exiting high-stage ethylene chiller 53 in conduit 220 can re-enter ethylene economizer 56, to be further sub-cooled by an indirect heat exchange means 61 in ethylene economizer 56. The resulting sub-cooled refrigerant stream exits ethylene economizer 56 through conduit 222 and can subsequently be routed to a pressure reduction means, illustrated here as expansion valve 62, whereupon the pressure of the refrigerant stream is reduced to thereby vaporize or flash a portion thereof. The resulting, cooled two-phase stream in conduit 224 enters low-stage ethylene chiller/condenser 55.

As shown in FIG. 1, a portion of the cooled natural gas stream exiting high-stage ethylene chiller 53 can be routed through conduit C to the heavies removal zone, while another portion of the cooled natural gas stream exiting high-stage ethylene chiller 53 can be routed through conduit 122 to enter indirect heat exchange means 63 of low-stage ethylene chiller/condenser 55. The remaining portion of the cooled natural gas stream in conduit 122 can then be combined the first column vapor stream exiting the heavies removal zone in conduit D and/or may be combined with a stream exiting methane refrigeration cycle 70 in conduit 168, for the resulting composite stream to then enter indirect heat exchange means 63 in low-stage ethylene chiller/condenser 55, as shown in FIG. 1.

In low-stage ethylene chiller/condenser 55, the cooled stream (which can comprise the stream in conduit 122 optionally combined with streams in conduits D and 168) can be at least partially condensed through indirect heat exchange with the ethylene refrigerant entering low-stage ethylene chiller/condenser 55 through conduit 224. The vaporized ethylene refrigerant exits low-stage ethylene chiller/condenser 55 through conduit 226 and can then enters ethylene economizer 56. In ethylene economizer 56, the vaporized ethylene refrigerant stream can be warmed through an indirect heat exchange means 64 prior to being fed into the low-stage inlet port of ethylene compressor 51 through conduit 230. As shown in FIG. 1, a stream of compressed ethylene refrigerant exits ethylene compressor 51 through conduit 236 and can subsequently be routed to ethylene cooler 52, wherein the compressed ethylene stream can be cooled through indirect heat exchange with an external fluid (e.g., water or air). The resulting cooled ethylene stream can then be introduced through conduit 202 into high-stage propane chiller 33B for additional cooling as previously described.

The cooled natural gas stream exiting low-stage ethylene chiller/condenser 55 in conduit 124 can also be referred to as the "pressurized LNG-bearing stream" As shown in FIG. 1, the pressurized LNG-bearing stream exits low-stage ethylene chiller/condenser 55 through conduit 124 prior to entering main methane economizer 73. In main methane economizer 73, the methane-rich stream in conduit 124 can be cooled in an indirect heat exchange means 75 through indirect heat exchange with one or more methane refrigerant streams. The cooled, pressurized LNG-bearing stream exits main methane economizer 73 through conduit 134 and can then be routed into expansion section 80 of methane refrigeration cycle 70. In expansion section 80, the pressurized LNG-bearing stream first passes through high-stage methane expansion valve 81 and/or expander, whereupon the pressure of this stream is reduced to thereby vaporize or flash a portion thereof. The resulting two-phase methane-rich stream in conduit 136 can then enter high-stage methane flash drum 82, whereupon the vapor and liquid portions of the reduced-pressure stream can be separated. The vapor portion of the reduced-pressure stream (also called the high-stage flash gas) exits high-stage methane flash drum 82 through conduit 138 to then enter main methane economizer 73, wherein at least a portion of the high-stage flash gas can be heated through indirect heat exchange means 76 of main methane economizer 73. The resulting warmed vapor stream exits main methane economizer 73 through conduit 138 and can then be routed to the high-stage inlet port of methane compressor 71, as shown in FIG. 1.

The liquid portion of the reduced-pressure stream exits high-stage methane flash drum 82 through conduit 142 to then re-enter main methane economizer 73, wherein the liquid stream can be cooled through indirect heat exchange means 74 of main methane economizer 73. The resulting cooled stream exits main methane economizer 73 through conduit 144 and can then be routed to a second expansion stage, illustrated here as intermediate-stage expansion valve 83 but could include an expander. Intermediate-stage expansion valve 83 further reduces the pressure of the cooled methane stream which reduces the stream's temperature by vaporizing or flashing a portion thereof. The resulting two-phase methane-rich stream in conduit 146 can then enter intermediate-stage methane flash drum 84, wherein the liquid and vapor portions of this stream can be separated and can exit the intermediate-stage flash drum 84 through respective conduits 148 and 150. The vapor portion (also called the intermediate-stage flash gas) in conduit 150 can re-enter methane economizer 73, wherein the vapor portion can be heated through an indirect heat exchange means 77 of main methane economizer 73. The resulting warmed stream can then be routed through conduit 154 to the intermediate-stage inlet port of methane compressor 71, as shown in FIG. 1.

The liquid stream exiting intermediate-stage methane flash drum 84 through conduit 148 can then pass through a low-stage expansion valve 85 and/or expander, whereupon the pressure of the liquefied methane-rich stream can be further reduced to thereby vaporize or flash a portion thereof. The resulting cooled, two-phase stream in conduit 156 can then enter low-stage methane flash drum 86, wherein the vapor and liquid phases can be separated. The liquid stream exiting low-stage methane flash drum 86 through conduit 158 can comprise the liquefied natural gas (LNG) product. The LNG product, which is at about atmospheric pressure, can be routed through conduit 158 downstream for subsequent storage, transportation, and/or use.

The vapor stream exiting low-stage methane flash drum (also called the low-stage methane flash gas) in conduit 160 can be routed to methane economizer 73, wherein the low-stage methane flash gas can be warmed through an indirect heat exchange means 78 of main methane economizer 73. The resulting stream can exit methane economizer 73 through conduit 164, whereafter the stream can be routed to the low-stage inlet port of methane compressor 71.

Methane compressor 71 can comprise one or more compression stages. In one embodiment, methane compressor 71 comprises three compression stages in a single module. In another embodiment, one or more of the compression modules can be separate, but can be mechanically coupled to a common driver. Generally, one or more intercoolers (not shown) can be provided between subsequent compression stages.

As shown in FIG. 1, the compressed methane refrigerant stream exiting methane compressor 71 can be discharged into conduit 166. A portion of the compressed methane refrigerant stream exiting compressor 71 through conduit 166 can be routed through conduit F to the heavies removal zones, while another portion of the compressed methane refrigerant can be routed to methane cooler 72, whereafter the stream can be cooled through indirect heat exchange with an external fluid (e.g., air or water) in methane cooler 72. The resulting cooled methane refrigerant stream exits methane cooler 72 through conduit 112, whereafter a portion of the methane refrigerant can be routed through conduit H to the heavies removal zones, while the remaining portion of the methane refrigerant stream can be directed to and further cooled in propane refrigeration cycle 30.

Upon being cooled in propane refrigeration cycle 30 through heat exchanger means 37, the methane refrigerant stream can be discharged into conduit 130 and subsequently routed to main methane economizer 73, wherein the stream can be further cooled through indirect heat exchange means 79. The resulting sub-cooled stream exits main methane economizer 73 through conduit 168 and can then combined with stream in conduit 122 exiting high-stage ethylene chiller 53 and/or with stream in conduit D exiting the heavies removal zone prior to entering low-stage ethylene chiller/condenser 55, as previously discussed.

Several heat exchange means (e.g., 39, 41, 45, 57) are shown and discussed above as being part of the LNG facility of FIG. 1. One or more of the heat exchangers in the LNG facility may be core-in-shell heat exchangers that include baffles, as discussed above. Embodiments of the invention are discussed below with reference to exemplary heat exchangers 300 (FIG. 3) and 400 (FIG. 4) that may be employed as one of the above-discussed heat exchange means. The heat exchangers 300, 400 according to embodiments of the invention reduce the hydraulic pressure drop due to cross flow while maintaining the slosh suppression via baffle plates (e.g., 1 in FIG. 2) by draining shell-side liquid in multiple locations as detailed below.

Figure 3:
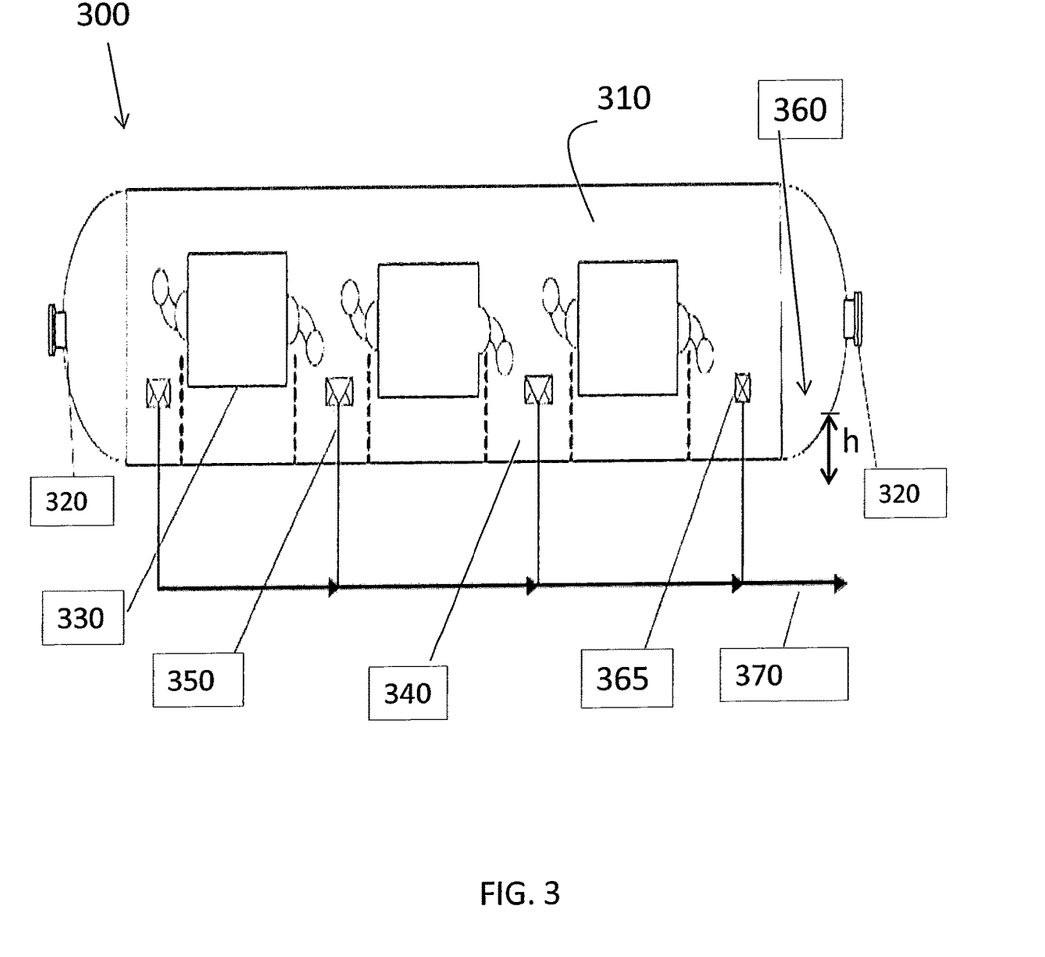
FIG. 3 illustrates a heat exchanger according to an embodiment of the invention.

FIG. 3 illustrates a heat exchanger 300 according to an embodiment of the invention. The view shown in FIG. 3 is a cut-away view that exposes the inner components of the heat exchanger 300. The heat exchanger 300 includes a shell 310 shown with two maintenance access manways 320. Disposed in the shell 310 are three cores 330, and six baffles 340, one on each side of each core 330. In alternate embodiment, different numbers of cores 330 (one or more) and baffles 340 may be used. Each drain pipe 350 places a drain 360, which may include a vortex breaker 365 to prevent the formation of a vortex that entrains vapor in the liquid stream, at a specified height h from the bottom of the shell 310. The drain 360 is continuously operating rather than being a manually operated maintenance drain, for example. As such, the drain 360 carries fluid out through the drain pipe 350 to the outlet drain line 370 when the fluid reaches the drain 360. By positioning the drain 360 at a height h rather than at the bottom of the shell, a specified fluid level is maintained within the shell 310 (a refrigerant inventory is maintained in the shell 310 at process shutdown).

The drain pipe 350 may be constructed in multiple sections and mounted within the shell 310 in a way that facilitates removal and replacement of sections with a different diameter or length of pipe. The diameter and length of the drain pipe 350 may be selected to take into account the internal velocity imposed on each drain 360 to ensure that adequate space is provided between the normal operating range of liquid level and the top of the drain pipe 350 (entrance to the drain 360). In this way, ingestion of vapor (generated from the refrigerant during heat exchange) into the drain pipe 350 does not occur. The vortex breaker 365 that may be employed at one or more drains 360 also works to minimize vapor ingestion into the drain 360 outlets in addition to minimizing vortex formation. The position of the drain pipe 350 may also be selected such that the velocity head (energy of the shell-side fluid due to its bulk motion, expressed as a length measurement) created by the liquid entering the drain 360 is maintained to be less than the distance between the drain 360 and the lowest point of the operating range of liquid levels included in the design margin. That is, if the drain pipe 350 length is too short such that the drain 360 is positioned too low within the shell 310, the shell-side liquid (refrigerant) may drain out of the shell 310 even when it is (at the lowest point) in the normal range of acceptable liquid levels. The number of drains 360, their location, and the height h of the drain pipes 350 are all variables that may be selected based on several factors. The arrangement according to the embodiment shown in FIG. 3 facilitates adjusting the position of the drain 360 by simply adjusting the length of the drain pipe 350. Thus, if conditions change and those conditions affect the operating range of liquid levels, the drain 360 height may be adjusted, based on adjusting the drain pipe length 350, to account for the change.

Figure 4:
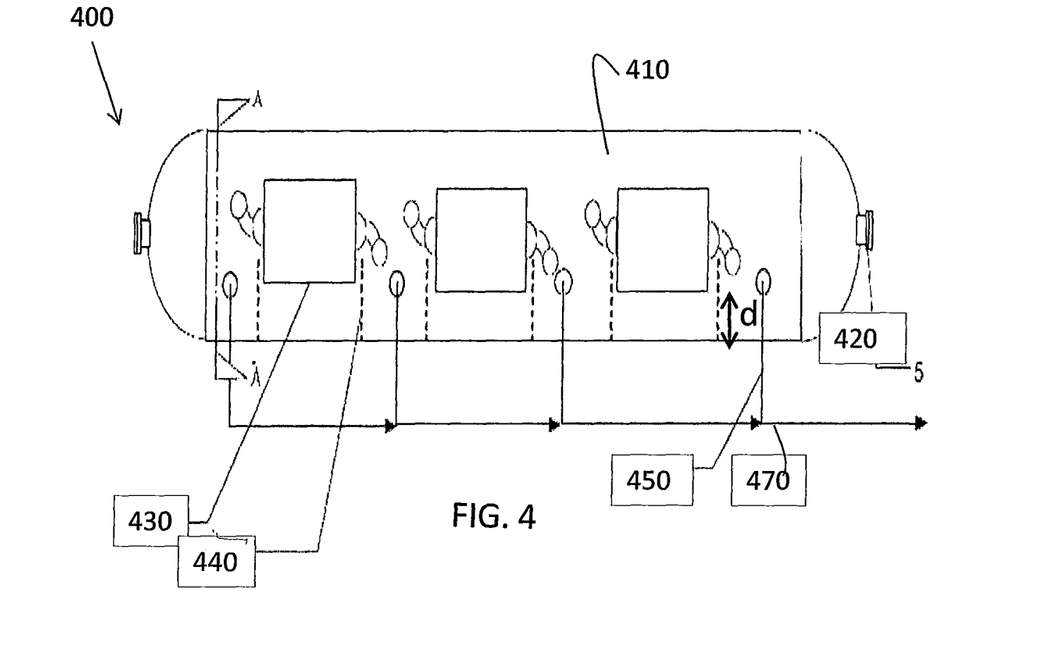
FIG. 4 illustrates a heat exchanger according to another embodiment of the invention.
Figure 5:
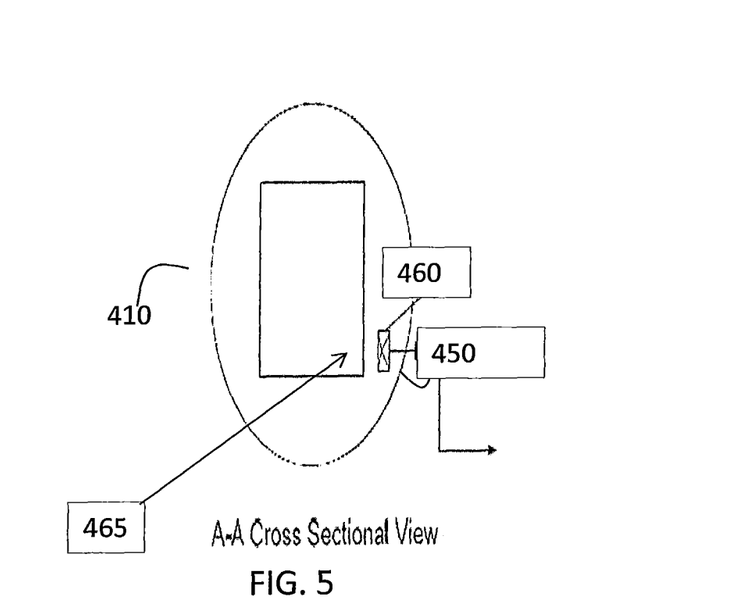
FIG. 5 is a cross sectional view of the heat exchanger shown in FIG. 4 along A-A.

FIG. 4 illustrates a heat exchanger 400 according to another embodiment of the invention. FIG. 5 is a cross sectional view of the heat exchanger 400 shown in FIG. 4 along A-A. The components inside the heat exchanger 400 are shown, as are the opening in the shell 410 for the drain pipe 450. That is, the views shown in FIGS. 4 and 5 depict a transparent shell 410. Two maintenance access manways 420 are shown for the shell 410. Three cores 430 and six baffles 440, one on each side of each core 430, are also shown. In alternate embodiments, the number of cores 430 or baffles 440 may be different. Each drain pipe 450 connects to a drain 460, which may include a vortex breaker 465 to prevent the formation of a vortex that entrains vapor in the liquid stream. Each continuously operating drain 460 is positioned at a predefined height d from the bottom of the shell 410. The drain pipe 450 associated with each drain 460 channels the drained shell-side fluid (refrigerant) to an outlet drain line 470. The number of drains 460, their location, and height d within the shell 410 at which each drain 460 opening is positioned may be selected as discussed above with reference to FIG. 3. For example, the height d of the drain 460 may be selected to avoid ingestion of vapor into the drain pipe 450 and to ensure that drainage of the shell-side liquid does not occur with the shell-side liquid is within the normal operating range of liquid level. As another example, the height d may also be selected to ensure that a refrigerant inventory is maintained at process shutdown (i.e., drain 460 position is not too low on the shell 410).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of exchanging heat in a core-in-shell heat exchanger disposed on a slosh-inducing moving platform, the method comprising:
introducing a shell-side fluid into a shell of the core-in-shell heat exchanger;
introducing a fluid to be cooled into each of one or more cores of the core-in-shell heat exchanger, the one or more cores being arranged along an axial length of the shell with a plurality of baffles disposed one either side of the one or more cores along the axial length of the shell to reduce slosh of the shell-side fluid; and
draining excess shell-side fluid using a plurality of drains, at least two of the plurality of drains being horizontally arranged along the axial length on opposite sides of one of the plurality of baffles, the plurality of drains positioned at one or more variable heights, the one or more variable heights including a height above a bottom of the shell and below a top of the shell to maintain a specified fluid level within the shell.

2. The method according to claim 1, wherein the introducing of the shell-side fluid includes introducing refrigerant into the shell.

3. The method according to claim 1,
wherein,
each of the plurality of drains is positioned at the one or more variable heights within the shell at the end of one of a plurality of the drain pipes, and
each of the plurality of drain pipes protrudes into the shell from the bottom of the shell and coupled to an outlet drain line outside the shell.

4. The method according to claim 3, further comprising:
independently adjusting the one or more variable heights of each of the plurality of drains by changing a length of a corresponding one of the plurality of drain pipes.

5. The method according to claim 1, wherein the draining of the excess shell-side fluid includes the plurality of drains being disposed through a side wall of the shell at the one or more variable heights.

6. The method according to claim 5, wherein the one or more heights is a same height within the shell for each of the plurality of drains.

7. A method of fabricating a core-in-shell heat exchanger disposed on a moving platform, the method comprising:
arranging one or more cores along an axial length of a shell;
arranging a plurality of baffles on either side of the one or more cores along the axial length of the shell to prevent sloshing of shell-side fluid; and
disposing a plurality of drains in the shell, at least two of the plurality of drains being horizontally arranged along the axial length on opposite sides of one of the plurality of baffles, the plurality of drains positioned at one or more variable heights, the one or more variable heights including a height above a bottom of the shell and below a top of the shell to maintain a specified fluid level within the shell.

8. The method according to claim 7, wherein the disposing of the plurality of drains includes disposing a vortex breaker at least one of the plurality of drains.

9. The method according to claim 7,
wherein,
the disposing of the plurality of drains includes positioning each of the plurality of drains at the one or more variable heights within the shell at an end of one of a plurality of drain pipes, and
each of the plurality of drain pipes protrudes into the shell from the bottom of the shell and is coupled to a drain outlet outside the shell.

10. The method according to claim 9, wherein the positioning of each of the plurality of drains includes independently adjusting the one or more heights of each of the plurality of drain pipes.

11. The method according to claim 10, wherein the independently adjusting of the one or more heights of each of the plurality of drain pipes includes adding or removing segments of each of the plurality of drain pipes.

12. The method according to claim 7, wherein the disposing of plurality of drains includes positioning the plurality of drains through a side wall of the shell at the one or more heights.

13. The method according to claim 12,
wherein,
the positioning of the plurality of drains includes connecting each of the plurality of drains to one of a plurality of drain pipes, and
each of the plurality of drain pipes is coupled to one of a plurality of a drain outputs outside the shell.

14. A core-in-shell heat exchanger comprising:
a shell disposed in an offshore liquefied natural gas processing environment;
one or more cores arranged along an axial length of the shell;
a plurality of baffles arranged on either side of the one or more cores along the axial length of the shell to prevent sloshing of shell-side fluid; and
a plurality of drains, at least two of the plurality of drains being horizontally arranged along the axial length of the shell on opposite sides of one of the plurality of baffles, each of the plurality of drains positioned at one or more variable heights, the one or more variable heights including a height above a bottom of the shell and below a top of the shell to maintain a specified fluid level within the shell.

15. The core-in-shell heat exchanger according to claim 14, wherein the plurality of baffles are arranged such that each of the one or more cores includes one of the plurality of baffles on each side along the axial length of the shell.

16. The core-in-shell heat exchanger according to claim 14, wherein the plurality of drains is arranged such that each of the plurality of drains is between a different set of baffles corresponding with adjacent cores.

17. The core-in-shell heat exchanger according to claim 14, wherein at least one of the plurality of drains includes a vortex breaker.

18. The core-in-shell heat exchanger according to claim 14,
wherein,
each of the plurality of drains is positioned at the or more variable heights within the shell at an end of one of a plurality of drain pipes, and
each of the plurality of drain pipes protrudes into the shell from the bottom of the shell and is coupled to a drain outlet outside the shell.

19. The core-in-shell heat exchanger according to claim 18, wherein the one or more variable heights of each of the plurality of drains is configured to be independently adjusted by changing a length of corresponding one of the plurality of drain pipes.

20. The core-in-shell, A heat exchanger according to claim 14, wherein the plurality of drains is disposed at a respective position at a side wall of the shell at a specified height.

* * * * *